(12) United States Patent
Waidelich et al.

US012522944B2

(10) Patent No.: US 12,522,944 B2
(45) Date of Patent: Jan. 13, 2026

(54) METHOD FOR THE SURFACE TREATMENT AND/OR MANUFACTURE OF A MEDICAL PRODUCT, AND MEDICAL PRODUCT

(71) Applicant: Aesculap AG, Tuttlingen (DE)

(72) Inventors: Lukas Waidelich, Tuttlingen (DE); Andreas Gassner, Tuttlingen (DE); Ramon Schauer, Tuttlingen (DE); Christian Grimm, Tuttlingen (DE); Stefan Boner, Sigmaringendorf (DE)

(73) Assignee: Aesculap AG, Tuttlingen (DE)

( * ) Notice: Subject to any disclaimer, the term of this patent is extended or adjusted under 35 U.S.C. 154(b) by 587 days.

(21) Appl. No.: 17/917,132

(22) PCT Filed: Apr. 1, 2021

(86) PCT No.: PCT/EP2021/058713
§ 371 (c)(1),
(2) Date: Oct. 5, 2022

(87) PCT Pub. No.: WO2021/204699
PCT Pub. Date: Oct. 14, 2021

(65) Prior Publication Data
US 2023/0151509 A1 May 18, 2023

(30) Foreign Application Priority Data
Apr. 6, 2020 (DE) .................. 10 2020 204 430.9

(51) Int. Cl.
| | |
|---|---|
| *C25F 3/06* | (2006.01) |
| *A61B 17/00* | (2006.01) |
| *B24C 1/06* | (2006.01) |
| *C23C 22/06* | (2006.01) |
| *C25F 3/24* | (2006.01) |

(52) U.S. Cl.
CPC ............ *C25F 3/06* (2013.01); *A61B 17/00* (2013.01); *B24C 1/06* (2013.01); *C25F 3/24* (2013.01); *A61B 2017/00526* (2013.01); *C23C 22/06* (2013.01)

(58) Field of Classification Search
CPC ...... C25F 3/00; C25F 3/06; C25F 3/16; A61B 17/00
See application file for complete search history.

(56) References Cited

U.S. PATENT DOCUMENTS 5,057,108 A * 10/1991 Shetty ................ C25F 3/24
                                            606/53
9,504,554 B2    11/2016 Bayer et al.

2007/0061006 A1    3/2007  Desatnik et al.
2009/0217626 A1*   9/2009  Kemp .................... A61L 2/24
                                                    53/97
2017/0114472 A1*   4/2017  Choi ..................... C25F 3/06
2019/0345628 A1   11/2019  Hansal et al.
2022/0002896 A1    1/2022  Bayer et al.

FOREIGN PATENT DOCUMENTS

| CN | 101326305 A | 12/2008 |
| CN | 103388173 A | 11/2013 |
| CN | 106048707 A | 10/2016 |
| CN | 106048707 B | 9/2018 |
| DE | 102018218393 A1 | 4/2020 |
| WO | 2005004941 A1 | 1/2005 |
| WO | 2017151548 A1 | 9/2017 |
| WO | 2018102844 A1 | 6/2018 |

OTHER PUBLICATIONS

Han, Wei; Fang, Fengzhou. "Two-step electropolishing of 316L stainless steel in a sulfuric acid-free electrolyte." Journal of Materials Processing Technology, 2020, 279, 116558 (Year: 2019).*
Sajjad Habibzadeh, Ling Li, Dominique Shum-Tim, Elaine C. Davis, Sasha Omanovic. "Electrochemical polishing as a 316L stainless steel surface treatment method: Towards the improvement of biocompatibility." Corrosion Science, 2014, 87, 89-100 (Year: 2014).*
Search Report received in International Application No. PCT/EP2021/058713 dated Jun. 28, 2021, with translation, 6 pages.
Written Opinion received in International Application No. PCT/EP2021/058713 dated Jun. 28, 2021, with translation, 13 pages.
Office Action received in Chinese Application No. 202180040714.3 dated May 26, 2023, with translation, 18 pages.
Shiying, "Household Electrical Appliances Technology," China Machine Press, 1st edition, Jul. 1994, with translation, 149 pages.

* cited by examiner

*Primary Examiner* — Brian W Cohen
*Assistant Examiner* — Nathanael Jason Downes
(74) *Attorney, Agent, or Firm* — Christopher A. Rothe; CM Law

(57) ABSTRACT

A medical product and a method of surface treatment and/or manufacture of a medical product. The medical product includes a metal or an alloy or consists of a metal or an alloy. The method includes the following steps: a) dulling a surface of the medical product, b) electropolishing the dulled surface of the medical product, c) electrochemically etching the dulled and electropolished surface of the medical product and d) electropolishing the dulled, electropolished and electrochemically etched surface of the medical product. The medical product has at least one of the following features:
  a pitting corrosion potential of 100 mV to 1200 mV, and/or
  a contact angle of 80° to 140°, and/or
  a passive layer having a thickness of 1 nm to 10 nm, which coats at least sections of the surface of the medical product.

20 Claims, No Drawings

METHOD FOR THE SURFACE TREATMENT AND/OR MANUFACTURE OF A MEDICAL PRODUCT, AND MEDICAL PRODUCT

CROSS-REFERENCE TO RELATED APPLICATIONS

This application is the United States national stage entry of International Application No. PCT/EP2021/058713, filed Apr. 1, 2021, and claims priority to German Application No. 10 2020 204 430.9, filed Apr. 6, 2020. The contents of International Application No. PCT/EP2021/058713 and German Application No. 10 2020 204 430.9 are incorporated by reference herein in their entireties.

FIELD

The invention relates to a method of surface treatment or processing and/or manufacture of a medical product and to a medical product.

BACKGROUND

Medical products, such as surgical instruments in particular, are generally subjected to a surface treatment before they are complete. For this purpose, the surfaces of the products are processed, for example, by means of slide finishing and/or belt finishing. This can eliminate defects in the parent material and/or forging-related defects, for example decarburized regions, or surface defects, for example pores, scars or cracks, which would otherwise have an adverse effect on the corrosion resistance of the products.

However, belt finishing can give rise to fine notches or elevations on the product surface. These can be turned over or flattened in a subsequent treatment step. This can give rise to doubled-over material. Moreover, there can be isolated instances of material transfer, for example of silicon oxide particles, from an abrasive belt to the product surface. Such material transfer and the stress on the medical product associated with the mechanical processing can in turn generate or increase intrinsic stresses in the product. An additional problem is that surface defects in the product that have not been eliminated or have been generated in the grinding operation can be eliminated only to a limited degree in a downstream treatment step.

Dulling of a medical product can be accomplished using spherical blasting agents, for example glass beads. This results in plastic deformation of the product surface, by means of which it is increased in size and roughened. Since glass beads are generally very hard (Mohs hardness of 6) and are brittle as well, some degree of breakage of the blasting agent will occur over time. As a result, both spherical glass beads and broken glass beads will hit the surface of the product during the dulling step. While broken glass beads will create sharp notches on the product surface, unbroken glass beads will leave spherical indentations on the surface of the product. As a result of the impact of broken and unbroken glass beads, there is an interaction between the product surface notched by the broken glass beads and the product surface smoothed by the unbroken glass beads. This can likewise result in doubled-over material. In addition to the plastic deformation and the associated generation of intrinsic stresses, material transfer of the blasting agent to the product surface can take place. This material transfer is particularly significant in the region of notches, in which accumulated glass bead material can remain.

As an alternative to the blasting agent treatment described above using the example of glass beads, it is possible to brush the surfaces of medical products. For this purpose, the product surfaces may be processed with brushing disks, for example with the aid of an abrasive pad or of nylon fibers in a disk arrangement with abrasive particles. Aluminum oxide and/or silicon oxide particles have typically been applied to the brushing disks. A brushing step increases the corrosion resistance of the product surface by comparison with a dulled product surface, but a disadvantage is that brushed product surfaces have greater reflection characteristics than dulled product surfaces.

It is also known that microstructures or notches formed by doubled-over material on a product surface and any associated generation or increase of intrinsic stresses in the product have an adverse effect on the corrosion resistance thereof. In the case of material transfer, for example during belt finishing and/or dulling, an additional factor is that the material transferred generates additional microstructures and can cause the weakening of a passivation layer.

SUMMARY

It is an object of the invention to provide a method of surface treatment or processing and/or manufacture of a medical product, which at least partly avoids disadvantages that occur in methods of the generic type and especially leads to a medical product having elevated corrosion resistance and scratch resistance and reduced reflection characteristics.

It is a further object of the invention to provide a corresponding medical product.

In a first aspect, the invention relates to a method of surface treatment or processing and/or manufacture of a medical product, wherein the medical product comprises a metal or an alloy or consists of a metal or an alloy. The method comprises the following steps:
  dulling a surface of the medical product,
  electropolishing the dulled surface of the medical product,
  electrochemically etching the dulled and electropolished surface of the medical product and
  electropolishing the dulled, electropolished and electrochemically etched surface of the medical product.

The method may comprise the aforementioned steps especially in direct succession.

The expression "medical product" in the context of the present invention may mean a medical end product, preferably a surgical instrument, or a precursor, especially a semifinished product, a blank or a semifabricated product, of a medical end product, preferably a surgical instrument, or a component of a medical end product, preferably of a surgical instrument.

The expression "alloy" in the context of the present invention shall be understood to mean a macroscopically homogeneous metallic material composed of at least two elements (components), of which at least one element is a metal. Accordingly, the expression "alloy" in the context of the present invention may mean a macroscopically homogeneous metallic material consisting of at least two different metals. Alternatively, the expression "alloy" in the context of the present invention may mean a macroscopically homogeneous metallic material consisting of at least one metal and at least one nonmetal, for example carbon.

It has been found that, surprisingly, the disadvantages mentioned at the outset in the context of conventional surface treatments of medical products can be partly or even completely avoided by a combination of a dulling step, a (first) electropolishing step, an electrochemical etching step and a further (second) electropolishing step.

Thus, the dulling step generates a microstructure that reduces the reflection of light on the surface of the medical product. The subsequent electropolishing step results in smoothing of this microstructure, which generates a smooth and shiny product surface. In addition, the electropolishing step, through adsorption of oxygen, advantageously leads to formation of a passive layer, especially a thick and dense passive layer, on the electropolished product surface, and therefore to an improvement in the corrosion resistance of the medical product. The subsequent electrochemical etching step particularly advantageously likewise brings about an improvement in corrosion resistance, especially an additional improvement in corrosion resistance, of the medical product. The (additional) improvement in corrosion resistance is especially (likewise) based on favored formation of a passive layer on the product surface. Moreover, the improvement in corrosion resistance brought about by the electrochemical etching step may be the result of the degradation of corrosion-triggering material defects and/or the avoidance or reduction of compressive stresses and tensile stresses and/or doubled-over material and/or overlapping material on the surface of the medical product. Through the formation of a preferably open microstructure on the product surface, the electrochemical etching step also brings about a (new) reduction in the reflection of light, which is slightly increased by the (first) electropolishing step on account of the smoothing of the microstructure generated by the dulling. The electrochemical etching step thus brings about not only an improvement in corrosion resistance of the medical product but also dulling of the surface thereof. This significantly simplifies the handling of the medical product for a user. For example, this can prevent a surgeon in the operating theatre being dazzled by the medical product. The subsequent further (second) electropolishing step preferably brings about slight smoothing of the surface of the medical product, which achieves a dull shine. The result is that improved reflection characteristics of the medical product are achievable, especially without smoothing the microstructure generated by the electrochemical etching step.

In the case of a medical product made of a chromium-containing or chromium-alloyed stainless steel, the basis of the positive effect of the electrochemical etching step on light reflection characteristics and the corrosion resistance of the medical product is especially that hexavalent chromium ions go into solution during the electrochemical etching operation. As a result, chromium-rich oxide layers at the surface of the medical product are removed, which enables direct attack by an acid used for the electrochemical etching operation on chemical and physical inhomogeneities, such as chromium carbide-containing regions around chromium carbides, in the surface of the medical product. This gives rise, especially at sites of former chromium carbide regions, to a microstructure, especially with or in the form of preferably open etching pits, on the surface of the medical product. In addition, it is advantageously possible to break up interfacial regions, especially lath and subblock boundaries, which can especially have the result that individual martensite laths stick out. The result is a roughened and especially dulled product surface at which incident light can be scattered. The degradation of chromium-depleted regions at the surface of the medical product advantageously also lowers the risk of formation of nucleation sites for pitting corrosion.

Further advantages of the method relate to improved cleanability of the medical product and especially to a lower tendency of the medical product to surface discoloration.

In one embodiment of the invention, the performance of step a) is preceded by a grinding operation, preferably a slide finishing and/or belt finishing operation, on the surface of the medical product.

For slide finishing, the medical product is preferably introduced into a vessel together with slide finishing bodies, preferably in the form of bulk material, or together with an aqueous solution containing slide finishing bodies and optionally additives. The additives optionally provided may be selected from the group consisting of anticorrosives, degreasing agents, pickling agents, separating agents (for example polymer beads having a diameter <1 mm) and mixtures thereof. Such a solution can advantageously take up and transport away abraded material formed by the slide finishing bodies and abraded product. Depending on the additive used in each case, it is additionally possible to achieve further effects, for example protection from corrosion, degreasing and adhesion prophylaxis.

An oscillating or rotating movement of the vessel gives rise to a relative movement between the medical product and the slide finishing bodies. This causes abrasion of material in the medical product, especially at the edges thereof. The surface image of the medical product, roughness, abrasion of material and deburring performance can advantageously be influenced in a controlled manner by machines used for slide finishing, grinding bodies and optional additives.

The slide finishing bodies may comprise a material or consist of a material selected from the group consisting of ceramic, plastic, natural products such as walnut shells, steel and combinations thereof.

In principle, the slide finishing bodies may be of regular and/or irregular shape.

The slide finishing bodies may especially be free of corners and/or edges, for example in ellipsoidal, toroidal or spherical form.

Alternatively or in combination, the slide finishing bodies may have corners and/or edges. In particular, the slide finishing bodies may be polyhedral, for example cubic, cuboidal, prism-shaped, pyramidal or parallelepiped-shaped. In addition, the slide finishing bodies may especially be configured as straight prisms and/or oblique prisms.

Alternatively or in combination, the slide finishing bodies may be conical and/or frustoconical.

In addition, it is possible to use a mixture of different slide finishing bodies for slide finishing of the medical product. For example, it is possible to use corner- and/or edge-free slide finishing bodies and polyhedral slide finishing bodies. Alternatively or in combination, it is possible to use different corner- and/or edge-free slide finishing bodies and/or different polyhedral slide finishing bodies. With regard to possible configurations and shapes, reference is made completely to the configurations and shapes described in the preceding paragraphs for the slide finishing bodies.

The slide finishing bodies may also have at least one dimension, especially at least one average dimension, for example a diameter, especially average diameter, and/or a height, especially average height, and/or a length, especially average length, in the range from 1 mm to 80 mm. The diameter of spherical slide finishing bodies in the context of the present invention shall be understood here to mean twice the radius of a single spherical slide finishing body. By contrast, the diameter of a nonspherical slide finishing body in the context of the present invention shall be understood to mean the greatest possible distance between two points that these can adopt relative to one another along a circumference line of a single nonspherical slide finishing body. The average dimensions mentioned in this paragraph can be determined, for example, by means of bulk density and/or optical measurement. The slide finishing can also be conducted in the form of barrel finishing, vibratory finishing, plunge finishing, drag finishing, centrifugal finishing or pressure flow lapping.

Belt finishing of the medical product is preferably accomplished using abrasive belts. For this purpose, it is especially possible to use abrasive belts that run over at least two rolls. The abrasive belts preferably have a grain size of 150 to 1200. The number of grains is guided here by the measurement unit mesh, i.e. the number of meshes in a grid per inch (25.4 mm). Accordingly, for example, an abrasive with grain size 150 will just pass through a sieve having 150 meshes per inch.

According to the invention, the performance of step a) may be preceded, for example, first by slide finishing and then by belt finishing. Belt finishing may be advantageous in particular with regard to the treatment of what is called a shadow region of the medical product, but also outside such a region. The shadow region defines the region of a medical product in which slide finishing bodies, especially on account of the geometric shape and/or configuration of the medical product, are ineffective or only of limited effectiveness on the surface.

Alternatively, the surface of the medical product may merely be finished by slide grinding prior to the performance of step a). This can avoid the formation of notches and/or elevations on the product surface that originate from belt grinding and, therefore, the corrosion resistance of the medical product can additionally be improved.

Alternatively, the surface of the medical product may merely be finished by belt grinding prior to the performance of step a).

In a further embodiment of the invention, in the performance or for the performance of step a), the surface of the medical product is treated with a blasting agent, especially a ductile, i.e. non-brittle, blasting agent. The use of a ductile blasting agent especially has the advantage that the generation of notches and/or microstructures, especially in the form of microscale gaps, can be prevented or at least reduced. This can in turn avoid or at least reduce the occurrence of local stress peaks in the medical product and in particular can additionally improve the corrosion resistance of the medical product. On top of that, the use of such a blasting agent can advantageously (additionally) improve the scratch resistance of the medical product.

In principle, the blasting agent may comprise a material or consist of a material selected from the group consisting of metal, metal oxide, alloy, ceramic, plastic, plant material, sand and combinations thereof.

The metal oxide may especially be corundum ($Al_2O_3$).

The plastic may especially be a urea resin, phenolic resin, polyester resin or melamine resin.

The ceramic may especially be glass or a mixed ceramic.

The alloy may be steel, especially stainless steel. The alloy is preferably a nonrusting steel, especially nonrusting stainless steel. With regard to suitable stainless steels, reference is made to the description that follows.

The sand may especially be garnet sand.

The blasting agent preferably comprises a metal or an alloy, or the blasting agent preferably consists of a metal or an alloy. With regard to suitable metals and alloys, reference is made to the description above. Such a blasting agent has the particular advantage that it does not break and therefore does not cause any notching of the surface of the medical product. On top of that, material transfer to the product surface can be reduced or even avoided entirely. Overall, this can additionally improve the corrosion resistance of the medical product and avoid the occurrence of unwanted intrinsic stresses in the product. Moreover, such a blasting agent is particularly suitable for increasing the scratch resistance of the medical product.

More preferably, the blasting agent comprises steel, especially stainless steel, or the blasting agent consists of steel, especially stainless steel. Such a blasting agent can result in particularly stark manifestation of the advantages mentioned in the last paragraph.

In principle, the blasting agent may be of regular and/or irregular shape, especially in the form of blasting agent bodies of regular and/or irregular shape.

In addition, it is particularly preferable that the blasting agent is free of corners and/or edges, especially in the form of corner- and/or edge-free blasting agent bodies. This can avoid the creation of notches on the surface of the medical product and therefore additionally improve the corrosion resistance thereof.

In principle, the blasting agent may be ellipsoidal, toroidal, spherical or bead-shaped, or be in the form of corresponding blasting agent bodies.

The blasting agent is preferably spherical and/or bead-shaped or in the form of spherical and/or bead-shaped blasting agent bodies.

Alternatively or in combination, the blasting agent may have corners and/or edges. In particular, the blasting agent may be polyhedral, for example cubic, cuboidal, prism-shaped, pyramidal or parallelepiped-shaped, or take the form of corresponding blasting agent bodies. The blasting agent may additionally take the form of a straight prism or oblique prism, or take the form of corresponding blasting agent bodies.

Alternatively or in combination, the blasting agent may be conical and/or frustoconical, or take the form of conical and/or frustoconical blasting agent bodies.

Alternatively or in combination, the blasting agent may be in globular form, for example in the form of a rounded wire, or in the form of correspondingly configured blasting agent bodies. Especially preferably, the blasting agent may be in the form of stainless steel wire grains.

Alternatively or in combination, the blasting agent may be in crushed form, especially in the form of crushed blasting agent bodies.

In addition, the blasting agent or blasting agent bodies may have at least one dimension, especially at least one average dimension, for example a diameter, especially average diameter, and/or a height, especially average height, and/or a length, especially average length, in the range from 40 μm to 2000 μm. The diameter of a spherical blasting agent or of spherical blasting agent bodies in the context of the present invention shall be understood here to mean twice the radius of a spherical blasting agent or of a single spherical blasting agent body. By contrast, the diameter of a nonspherical blasting agent or of nonspherical blasting agent bodies in the context of the present invention shall be understood to mean the greatest possible distance between two points that these can adopt relative to one another along a circumference line of a nonspherical blasting agent or of a single nonspherical blasting agent body. The average dimensions mentioned in this paragraph can be determined, for example, by means of laser diffraction or sieve analysis.

The blasting agent or blasting agent bodies can be accelerated onto the surface of the medical product, for example, by using jet blasting systems, injector blasting systems or wheel blasting systems. If a pressure jet or injector jet system is used, it is possible to use pressures of 1 bar to 6 bar.

Typically, the surface of the medical product is removed at the anode in an electrolyte solution in the performance or for the performance of step b), meaning that the medical product typically forms the anode in an electrochemical cell in the performance or for the performance of step b).

In a further embodiment of the invention, step b) is conducted over a period of 30 s to 130 s, especially 60 s to 100 s, preferably 90 s.

In principle, steps b) and d) can be performed at different voltages, especially DC voltages. Steps b) and d) are preferably each performed at the same voltage, especially DC voltage.

In a further embodiment of the invention, step b) and/or step d), especially each of step b) and step d), are conducted at/with a voltage, especially DC voltage, of ≥2.0 V, especially 2.0 V to 10.0 V, preferably 5 V to 9 V, more preferably 7 V to 8 V. Especially by virtue of the voltage values disclosed in this paragraph, the formation of a uniform polishing film and uniform transfer of the metal or alloy to the electrolyte solution are achievable.

In addition, step b) and/or step d) may be conducted at/with a constant or varying voltage, especially DC voltage. With regard to suitable voltage ranges/values, reference is made to the voltages disclosed in the preceding paragraph.

In a further embodiment of the invention, step b) and/or step d), especially each of step b) and step d), are conducted at/with a current density of 5 A/dm$^2$ to 50 A/dm$^2$, especially 8 A/dm$^2$ to 40 A/dm$^2$, preferably 15 A/dm$^2$ to 20 A/dm$^2$.

In addition, step b) and/or step d) may be performed more than once, especially twice, three times or four times. In particular, steps b) and d) may be repeated a different number of times. Multiple repetition of steps b) and d) can particularly advantageously result in uniform processing of geometric peculiarities of the medical product, for example a closure of the medical product, without giving rise to relevant shadowing. The closure of the medical product can be processed, for example, in two positions in order to give rise to only minor shadows. Alternatively, it may be preferable that the medical product is articulated gradually during the performance of step b) and/or d).

Alternatively, step b) and/or step d) may be performed just once.

In addition, the medical product, prior to the performance of step b) and/or prior to the performance of step d), may be cleaned and/or degreased.

Typically, the surface of the medical product is (likewise) removed at the anode in an electrolyte solution in the performance or for the performance of step c), meaning that the medical product typically forms (likewise) the anode in an electrochemical cell in the performance or for the performance of step c).

In a further embodiment of the invention, step c) is conducted over a period of 30 s to 130 s, especially 60 s to 100 s or 70 s to 110 s, preferably 90 s or 100 s. In principle, step c) may be conducted over a shorter or longer period of time than step b). Preferably, steps b) and d) are conducted over an equally long period of time.

In a further embodiment of the invention, step c) is conducted at/with a voltage, especially DC voltage, measured at the anode (at the medical product to be surface-treated or -processed and/or manufactured), of ≤2.1 V, especially <2 V, especially 1.2 V to 1.8 V, preferably 1.4 V to 1.7 V, more preferably 1.4 V to 1.5 V or 1.45 V to 1.65 V. In this configuration of the invention, the advantages of the invention that are achievable by virtue of the electrochemical etching step are particularly starkly manifested. The voltage is measured at the anode (at the medical product to be surface-treated or -processed and/or manufactured) preferably by means of a silver-silver chloride electrode. The voltages ascertained are then converted to a standard hydrogen electrode. Typically, the voltage is established at the current source without knowing which portion of the voltage is being applied to the anode and how much is being applied to residual resistances (for example wires, electrolyte, etc.). In the present invention, it is preferably the exact voltage at the anode which is crucial.

In addition, step c) may be conducted at/with a constant or varying voltage, especially DC voltage. With regard to suitable voltage ranges/values, reference is made to the voltages disclosed in the preceding paragraph.

In a further embodiment of the invention, step c) is conducted at/with a current density of 1.4 A/dm$^2$ to 2.4 A/dm$^2$, especially 1.6 A/dm$^2$ to 2.2 A/dm$^2$, preferably 1.8 A/dm$^2$ to 2.0 A/dm$^2$. By virtue of the (low) current densities disclosed in this paragraph, it is possible to particularly efficiently control electrochemical etching of the surface of the medical product over time.

In addition, step c) can be conducted at a temperature of 20° C. to 90° C., especially 50° C. to 80° C., preferably 70° C. to 80° C.

Preference is given to conducting step c) repeatedly, especially twice, three times or four times.

Multiple repetition of step c) can particularly advantageously result in uniform processing of geometric peculiarities of the medical product, for example a closure of the medical product, without giving rise to relevant shadowing. For this purpose, the closure of the medical product can (likewise) be processed, for example, in two positions in order to give rise to only minor shadows. Alternatively, it may be preferable that the medical product is (likewise) articulated gradually during the performance of step c).

Alternatively, step c) can be conducted just once.

Typically, the surface of the medical product is (likewise) removed at the anode in an electrolyte solution in the performance or for the performance of step d), meaning that the medical product typically forms (likewise) the anode in an electrochemical cell in the performance or for the performance of step d).

In a further embodiment of the invention, step d) is conducted over a shorter period of time than step b). Preferably, step d) is conducted over a period of 5 s to 20 s, especially 7 s to 15 s, preferably 10 s.

In a further embodiment of the invention, steps b), c) and d) are each conducted using an acidic aqueous electrolyte solution, especially comprising a mineral acid or a mixture of mineral acids. The mineral acid is preferably selected from the group consisting of phosphoric acid, sulfuric acid and a mixture thereof. A phosphoric acid-containing and/or sulfuric acid-containing aqueous electrolyte solution has been found here to be particularly advantageous for the treatment of the surface of a medical product made of stainless steel, especially nonrusting or corrosion-resistant stainless steel.

The acidic aqueous electrolyte solution may have a mineral acid content of 50% by weight to 95% by weight, especially 60% by weight to 95% by weight, preferably 75% by weight to 95% by weight, based on the total weight of the acidic aqueous electrolyte solution. In particular, the acidic aqueous electrolyte solution may have a phosphoric acid content of 20% by weight to 70% by weight, especially 30% by weight to 60% by weight, preferably 40% by weight to 50% by weight, and/or a sulfuric acid content of 10% by weight to 70% by weight, especially 20% by weight to 60% by weight, preferably 30% by weight to 50% by weight, based in each case on the total weight of the acidic aqueous electrolyte solution.

The acidic aqueous electrolyte solution may also be an aged acidic aqueous electrolyte solution.

The acidic aqueous electrolyte solution may further include additives, for example surface-active substances.

It is also advantageous that the aggressiveness of the acidic aqueous electrolyte solution can be controlled via the water content thereof. For example, the acidic aqueous electrolyte solution may have a water content of 5% by weight to 25% by weight, especially 5% by weight to 15% by weight, preferably 5% by weight to 10% by weight, based on the total weight of the acidic aqueous electrolyte solution.

In principle, steps b), c) and d) may each be conducted with a different acidic aqueous electrolyte solution, especially comprising a mineral acid or a mixture of mineral acids. Alternatively, steps b) and d) may each be conducted with the same acidic aqueous electrolyte solution, especially comprising a mineral acid or a mixture of mineral acids. In particular, the acidic aqueous electrolyte solution, especially comprising a mineral acid or a mixture of mineral acids, for performance of steps b) and d) may differ from the acidic aqueous electrolyte solution, especially comprising a mineral acid or a mixture of mineral acids, for performance of step c), especially in relation to the mineral acid and/or the mineral acid content. With regard to suitable mineral acids and mineral acid contents, reference is made to the above details in full.

In a further embodiment of the invention, the performance of step d) is followed by performance of a step e) of treating the dulled, electropolished, electrochemically etched and once again electropolished surface of the medical product with a passivating acid or a passivating acid-containing solution. In other words, in a further embodiment of the invention, the performance of step d) is followed by performance of a step e) of passivating the dulled, electropolished, electrochemically etched and once again electropolished surface of the medical product. In this way, it is particularly advantageously possible to additionally enhance or promote the formation of a passive layer on the surface of the medical product and therefore to additionally improve the corrosion resistance of the medical product. In the case of a medical product made from a chromium-containing or chromium-alloyed stainless steel, it is possible by means of a passivation layer, for example, to form thickened chromium oxide layers on the surface of the medical product.

In a further embodiment of the invention, the passivating acid used is citric acid, nitric acid or a mixture thereof.

The passivating acid-containing solution used for performance of step e) is preferably an aqueous citric acid-containing solution, especially with a citric acid content of 5% by weight to 60% by weight, based on the total weight of the aqueous citric acid-containing solution. Alternatively, the passivating acid-containing solution used for performance of step e) may preferably be an aqueous nitric acid-containing solution, especially with a nitric acid content of 5% by weight to 60% by weight, based on the total weight of the aqueous nitric acid-containing solution.

The use of citric acid has advantages over the use of nitric acid both from a health point of view and from an occupational safety point of view. On top of that, by means of citric acid, in the case of medical products made of chromium-containing or chromium-alloyed stainless steel, it is possible to achieve thicker chromium oxide layers than is the case when nitric acid is used, since the latter also reduces the proportion of other alloy constituents in the case of such a stainless steel.

For performance of step e), the medical product can be immersed, for example, into the passivating acid or passivating acid-containing solution. Alternatively, the passivating acid or the passivating acid-containing solution can be sprayed or poured onto the surface of the medical product.

In addition, step e) can be conducted over a period of 2 min to 2 h, especially 5 min to 60 min, preferably 10 min to 30 min.

In addition, step e) can be conducted within a temperature range from 20° C. to 80° C., especially 30° C. to 65° C., preferably 50° C. to 60° C.

In addition, between step d) and step e), it is possible to conduct a step de) of cleaning and/or degreasing the medical product, especially cleaning and/or degreasing the dulled, electropolished, electrochemically etched and once again electropolished surface of the medical product.

In a further embodiment of the invention, the performance of step e) is followed by performance of a step f) of packing and/or marking, especially labeling, of the medical product. Preferably, between step e) and step f), a step ef) of sterilizing, especially steam sterilizing, of the medical product is conducted. Alternatively, it may be preferable that performance of step f) is followed by performance of a step g) of sterilizing, especially steam sterilizing, of the medical product.

In a further embodiment of the invention, the medical product comprises steel, preferably stainless steel, or the medical product consists of steel, preferably stainless steel.

The expression "stainless steel" in the context of the present invention (in accordance with EN 10020) is understood to mean an alloyed or unalloyed steel having a particular level of purity, for example with a proportion by mass of sulfur and/or phosphorus of ≤0.025%, especially <0.025%.

The stainless steel may especially comprise at least one alloy elements selected from the group consisting of chromium, nickel, molybdenum, titanium, niobium, tungsten, vanadium, cobalt and combinations thereof.

In particular, the stainless steel may have a proportion by mass of chromium of 10% to 25%.

Further preferably, the stainless steel is a nonrusting or corrosion-resistant stainless steel.

Further preferably, the stainless steel is a chromium-containing or chromium-alloyed stainless steel. Preferably, the stainless steel is a chromium-containing corrosion-resistant stainless steel or a chromium-alloyed corrosion-resistant stainless steel.

In addition, the stainless steel may especially be a martensitic, ferritic or austenitic stainless steel.

Preferably, the stainless steel is a martensitic corrosion-resistant stainless steel, especially what is called a carbon martensite, i.e. a corrosion-resistant stainless steel with chromium and carbon as the main alloy constituents, or what is called a nickel martensite, i.e. a corrosion-resistant stainless steel with nickel as the main alloy constituent, according to ISO 7153-1.

In particular, the stainless steel may be a martensitic stainless steel having a proportion by mass of chromium of 10.5% to 13% and/or a proportion by mass of carbon of 0.2% to 1%.

Alternatively, the stainless steel may especially be an austenitic stainless steel having a proportion by mass of chromium of 16% to 21% and/or a proportion by mass of carbon of 0.02% to 0.12%.

Alternatively, the stainless steel may especially be a ferritic stainless steel having a proportion by mass of chromium of 12% to 18% and/or a proportion by mass of carbon of <0.2%.

For example, the stainless steel may be a stainless steel having the short material designation X12Cr13 (materials number 1.4006). This is a martensitic stainless steel having a proportion by mass of carbon of 0.08% to 0.15%, a proportion by mass of chromium of 11.5% to 13.5%, and a proportion by mass of nickel of ≤0.75%.

Alternatively, the stainless steel may be a martensitic, corrosion-resistant stainless steel having the short material designation X12CrS13 (materials number 1.4005). This stainless steel has a proportion by mass of carbon of 0.08% to 0.15%, a proportion by mass of chromium of 12.0% to 14.0% and a proportion by mass of molybdenum of ≤0.60%, and optionally a proportion by mass of sulfur of 0.1% to 0.35%.

Alternatively, the stainless steel may be a martensitic, corrosion-resistant stainless steel having the short material designation X20Cr13 (materials number: 1.4021). This stainless steel has a proportion by mass of carbon of 0.16% to 0.25% and a proportion by mass of chromium of 12.0% to 14.0%.

Alternatively, the stainless steel may be a martensitic, corrosion-resistant stainless steel having the short material designation X15Cr13 (materials number: 1.4024). This stainless steel has a proportion by mass of carbon of 0.12% to 0.17% and a proportion by mass of chromium of 12.0% to 14.0%.

Alternatively, the stainless steel may be a martensitic, corrosion-resistant stainless steel having the short material designation X30Cr13 (materials number: 1.4028). This stainless steel has a proportion by mass of carbon of 0.26% to 0.35% and a proportion by mass of chromium of 12.0% to 14.0%.

Alternatively, the stainless steel may be a martensitic, corrosion-resistant stainless steel having the short material designation X46Cr13 (materials number: 1.4034). This stainless steel has a proportion by mass of carbon of 0.43% to 0.50% and a proportion by mass of chromium of 12.5% to 14.5%.

Alternatively, the stainless steel may be a martensitic, corrosion-resistant stainless steel having the short material designation X50CrMoV15 (materials number: 1.4116). This stainless steel has a proportion by mass of carbon of 0.45% to 0.55%, a proportion by mass of chromium of 14.0% to 15.0%, a proportion by mass of molybdenum of 0.50% to 0.80%, and a proportion by mass of vanadium of 0.10% to 0.20%.

Alternatively, the stainless steel may be a martensitic, corrosion-resistant stainless steel having the short material designation X17CrNi16-2 (materials number: 1.4057). This stainless steel has a proportion by mass of carbon of 0.12% to 0.22%, a proportion by mass of chromium of 15.0% to 17.0%, and a proportion by mass of nickel of 1.5% to 2.5%.

Alternatively, the stainless steel may be a martensitic, corrosion-resistant stainless steel having the short material designation X39CrMo17-1 (materials number: 1.4122). This stainless steel has a proportion by mass of carbon of 0.33% to 0.45%, a proportion by mass of chromium of 15.5% to 17.5%, a proportion by mass of molybdenum of 0.8% to 1.3%, and a proportion by mass of nickel of ≤1.0%

Alternatively, the stainless steel may be a martensitic, corrosion-resistant stainless steel having the short material designation X14CrMoS17 (materials number: 1.4104). This stainless steel has a proportion by mass of carbon of 0.10% to 0.17%, a proportion by mass of chromium of 15.5% to 17.5%, a proportion by mass of molybdenum of 0.20% to 0.60%, and a proportion by mass of sulfur of 0.15% to 0.35%.

Alternatively, the stainless steel may be a martensitic, corrosion-resistant stainless steel having the short material designation X3CrNiMo13-4 (materials number: 1.4313). This stainless steel has a proportion by mass of carbon of ≤0.05%, a proportion by mass of chromium of 12.0% to 14.0%, a proportion by mass of molybdenum of 0.3% to 0.7%, and a proportion by mass of nickel of 3.5% to 4.5%.

Alternatively, the stainless steel may be a martensitic, corrosion-resistant stainless steel having the short material designation X4CrNiMo16-5-1 (materials number: 1.4418). This stainless steel has a proportion by mass of carbon of ≤0.06%, a proportion by mass of chromium of 15.0% to 17.0%, a proportion by mass of molybdenum of 0.80% to 1.50%, and a proportion by mass of nickel of 4.0% to 6.0%.

Alternatively, the stainless steel may be a martensitic stainless steel having the short material designation X65Cr13. This stainless steel has a proportion by mass of carbon of 0.58% to 0.70%, a proportion by mass of chromium of 12.5% to 14.5%, a proportion by mass of manganese of ≤1.00%, a proportion by mass of phosphorus of 0.04%, and a proportion by mass of sulfur of 0.015%.

Alternatively, the stainless steel may be a martensitic stainless steel having the short material designation X30CrMoN15-1 (materials number: 1.4108). This stainless steel has a proportion by mass of carbon of 0.25% to 0.35%, a proportion by mass of chromium of 14.0% to 16.0%, a proportion by mass of molybdenum of 0.85% to 1.10%, a proportion by mass of nickel of 0.50%, a proportion by mass of manganese of 1.00%, a proportion by mass of silicon of 1.00%, and a proportion by mass of nitrogen of 0.03% to 0.50%.

Alternatively, the stainless steel may be a martensitic stainless steel having the short material designation X70CrMo15 (materials number: 1.4109). This stainless steel has a proportion by mass of carbon of 0.60% to 0.75%, a proportion by mass of chromium of 14.0% to 16.0%, a proportion by mass of molybdenum of 0.40% to 0.80%, a proportion by mass of manganese of ≤1.00%, a proportion by mass of silicon of ≤0.70%, a proportion by mass of phosphorus of 0.04%, and a proportion by mass of sulfur of 0.015%.

Alternatively, the stainless steel may be a martensitic stainless steel having the short material designation X90CrMoV18 (materials number: 1.4112). This stainless steel has a proportion by mass of carbon of 0.90%, a proportion by mass of chromium of 17% to 19%, and a proportion by mass of molybdenum of 0.90%.

Alternatively, the stainless steel may be a martensitic stainless steel having the short material designation X38CrMoV15 (materials number: 1.4117). This stainless steel has a proportion by mass of carbon of 0.38%, a proportion by mass of chromium of 14% to 15%, and a proportion by mass of molybdenum of 0.50%.

Alternatively, the stainless steel may be a martensitic stainless steel having the short material designation X150CrMo17 (materials number: 1.4125). This stainless steel has a proportion by mass of carbon of 1.10%, a proportion by mass of chromium of 17%, and a proportion by mass of molybdenum of 0.60%.

Alternatively, the stainless steel may be a martensitic stainless steel having the short material designation X22CrMoNiS13-1 (materials number: 1.4121). This stainless steel has a proportion by mass of carbon of 0.20% to 0.25%, a proportion by mass of chromium of 12.0% to 14.0%, a proportion by mass of molybdenum of 1.00% to 1.50%, a proportion by mass of nickel of 0.80% to 1.20%, a proportion by mass of manganese of 1.00% to 1.50%, a proportion by mass of silicon of ≤1.00%, a proportion by mass of phosphorus of 0.045%, and a proportion by mass of sulfur of 0.15% to 0.25%.

Alternatively, the stainless steel may be a martensitic stainless steel having the short material designation X40CrMoVN16-2 (materials number: 1.4123). This stainless steel has a proportion by mass of carbon of 0.35% to 0.50%, a proportion by mass of chromium of 14.0% to 16.0%, a proportion by mass of molybdenum of 1.00% to 2.50%, a proportion by mass of nickel of 0.5%, a proportion by mass of manganese of ≤1.00%, a proportion by mass of silicon of ≤1.00%, a proportion by mass of phosphorus of 0.04%, and a proportion by mass of sulfur of 0.015%.

Alternatively, the stainless steel may be a martensitic stainless steel having the short material designation X105CrMo17 (materials number: 1.4125). This stainless steel has a proportion by mass of carbon of 0.95% to 1.20%, a proportion by mass of chromium of 16.0% to 18.0%, a proportion by mass of molybdenum of 0.04% to 0.80%, a proportion by mass of manganese of not more than 1.00%, a proportion by mass of silicon of not more than 1.00%, a proportion by mass of phosphorus of not more than 0.040%, and a proportion by mass of sulfur of not more than 0.15%.

Alternatively, the stainless steel may be a precipitation-hardening, corrosion-resistant stainless steel having the short material designation X5CrNiCuNb16-4 (materials number: 1.4542). This stainless steel has a proportion by mass of carbon of ≤0.07%, a proportion by mass of chromium of 15.0% to 17.0%, a proportion by mass of molybdenum of ≤0.60%, a proportion by mass of nickel of 3.0% to 5.0%, a proportion by mass of copper of 3.0% to 5.0%, and a proportion by mass of niobium of not more than 0.45%.

Alternatively, the stainless steel may be a precipitation-hardening, corrosion-resistant stainless steel having the short material designation X7CrNiAl17-7 (materials number: 1.4568). This stainless steel has a proportion by mass of carbon of ≤0.09%, a proportion by mass of chromium of 16.0% to 18.0%, a proportion by mass of nickel of 6.5% to 7.8%, and a proportion by mass of aluminum of 0.70% to 1.50%.

Alternatively, the stainless steel may be a precipitation-hardening, corrosion-resistant stainless steel having the short material designation X5CrNiMoCuNb14-5 (materials number: 1.4594). This stainless steel has a proportion by mass of carbon of ≤0.07%, a proportion by mass of chromium of 13.0% to 15.0%, a proportion by mass of molybdenum of 1.20% to 2.00%, a proportion by mass of nickel of 5.0% to 6.0%, a proportion by mass of copper of 1.20% to 2.00%, and a proportion by mass of niobium of 0.15% to 0.60%.

Alternatively, the stainless steel may be a precipitation-hardening, corrosion-resistant stainless steel having the short material designation X3CrNiTiMb12-9 (materials number: 1.4543). This stainless steel has a proportion by mass of carbon of ≤0.03%, a proportion by mass of chromium of 11.0% to 12.5%, a proportion by mass of molybdenum of ≤0.50%, a proportion by mass of nickel of 3.00% to 5.00%, a proportion by mass of titanium of ≤0.90% to 1.40%, a proportion by mass of copper of 1.50% to 2.50%, a proportion by mass of niobium of 0.10% to 0.50%, a proportion by mass of manganese of 0.50%, a proportion by mass of silicon of 0.50%, a proportion by mass of phosphorus of ≤0.02%, and a proportion by mass of sulfur of ≤0.015%.

Alternatively, the stainless steel may be a ferritic, corrosion-resistant stainless steel having the short material designation X2CrNi12 (materials number: 1.4003). This stainless steel has a proportion by mass of carbon of ≤0.03%, a proportion by mass of chromium of 10.5% to 12.5%, a proportion by mass of nickel of 0.3% to 1.00%, and a proportion of nitrogen of ≤0.03%.

Alternatively, the stainless steel may be a ferritic, corrosion-resistant stainless steel having the short material designation X2CrNi12 (materials number: 1.4512). This stainless steel has a proportion by mass of carbon of ≤0.03%, a proportion by mass of chromium of 10.5% to 12.5%, and a proportion by mass of titanium of not more than 0.65%.

Alternatively, the stainless steel may be a ferritic, corrosion-resistant stainless steel having the short material designation X6Cr17 (materials number: 1.4016). This stainless steel has a proportion by mass of carbon of ≤0.08% and a proportion by mass of chromium of 16.0% to 18.0%.

Alternatively, the stainless steel may be a ferritic, corrosion-resistant stainless steel having the short material designation X3CrTi17 (materials number: 1.4510). This stainless steel has a proportion by mass of carbon of ≤0.05%, a proportion by mass of chromium of 16.0% to 18.0%, and a proportion by mass of titanium of not more than 0.80%.

Alternatively, the stainless steel may be a ferritic, corrosion-resistant stainless steel having the short material designation X6CrMoS17 (materials number: 1.4105). This stainless steel has a proportion by mass of carbon of ≤0.08%, a proportion by mass of chromium of 16.0% to 18.0%, a proportion by mass of molybdenum of 0.20% to 0.60%, and a proportion by mass of sulfur of 0.15% to 0.35%.

Alternatively, the stainless steel may be a ferritic, corrosion-resistant stainless steel having the short material designation X3CrNb17 (materials number: 1.4511). This stainless steel has a proportion by mass of carbon of ≤0.05%, a proportion by mass of chromium of 16.0% to 18.0%, and a proportion by mass of niobium of not more than 1.00%.

Alternatively, the stainless steel may be a ferritic, corrosion-resistant stainless steel having the short material designation X2CrTiNb18 (materials number: 1.4509). This stainless steel has a proportion by mass of carbon of ≤0.03%, a proportion by mass of chromium of 17.5% to 18.5%, a proportion by mass of niobium of not more than 1.00%, and a proportion by mass of titanium of 0.10% to 0.60%.

Alternatively, the stainless steel may be a ferritic, corrosion-resistant stainless steel having the short material designation X6CrMo17-1 (materials number: 1.4113). This steel has a proportion by mass of carbon of ≤0.08%, a proportion by mass of chromium of 16.0% to 18.0%, and a proportion by mass of molybdenum of 0.90% to 1.40%.

Alternatively, the stainless steel may be a ferritic, corrosion-resistant stainless steel having the short material designation X2CrMoTi18-2 (materials number: 1.4521). This stainless steel has a proportion by mass of carbon of ≤0.025%, a proportion by mass of chromium of 17.0% to 20.0%, a proportion by mass of molybdenum of 1.80% to 2.50%, and a proportion by mass of titanium of not more than 0.80%.

Alternatively, the stainless steel may be an austenitic-ferritic, corrosion-resistant stainless steel having the short material designation X2CrNi22-2 (materials number:

1.4062). This stainless steel has a proportion by mass of carbon of ≤0.03%, a proportion by mass of chromium of 21.5% to 24.0%, a proportion by mass of molybdenum of ≤0.45%, a proportion by mass of nickel of 1.00% to 2.90%, and a proportion by mass of nitrogen of 0.16% to 0.28%.

Alternatively, the stainless steel may be an austenitic-ferritic, corrosion-resistant stainless steel having the short material designation X2CrMnNiN21-5-1 (materials number: 1.4162). This stainless steel has a proportion by mass of carbon of ≤0.04%, a proportion by mass of chromium of 21.0% to 22.0%, a proportion by mass of molybdenum of 0.10% to 0.80%, a proportion by mass of nickel of 1.35% to 1.70%, a proportion by mass of manganese of 4.0% to 6.0%, a proportion by mass of nitrogen of 0.20% to 0.25%, and a proportion by mass of copper of 0.10% to 0.80%.

Alternatively, the stainless steel may be an austenitic-ferritic, corrosion-resistant stainless steel having the short material designation X2CrNiN23-4 (materials number: 1.4362). This stainless steel has a proportion by mass of carbon of ≤0.03%, a proportion by mass of chromium of 22.0% to 24.0%, a proportion by mass of molybdenum of 0.10% to 0.60%, a proportion by mass of nickel of 3.5% to 5.5%, and a proportion by mass of copper of 0.10% to 0.60%.

Alternatively, the stainless steel may be an austenitic-ferritic, corrosion-resistant stainless steel having the short material designation X2CrNiMoN22-5-3 (materials number: 1.4462). This stainless steel has a proportion by mass of carbon of ≤0.03%, a proportion by mass of chromium of 21.0% to 23.0%, a proportion by mass of molybdenum of 2.5% to 3.5%, a proportion by mass of nickel of 4.5% to 6.5%, and a proportion by mass of nitrogen of 0.10% to 0.22%.

Alternatively, the stainless steel may be an austenitic-ferritic, corrosion-resistant stainless steel having the short material designation X2CrNiMnMoCuN24-4-3-2 (materials number: 1.4662). This stainless steel has a proportion by mass of carbon of ≤0.03%, a proportion by mass of chromium of 23.0% to 25.0%, a proportion by mass of molybdenum of 1.00% to 2.00%, a proportion by mass of nickel of 3.0% to 4.5%, a proportion by mass of manganese of 2.5% to 4.0%, and a proportion by mass of copper of 0.10% to 0.80%.

Alternatively, the stainless steel may be an austenitic-ferritic, corrosion-resistant stainless steel having the short material designation X2CrNiMoN25-7-4 (materials number: 1.4410). This stainless steel has a proportion by mass of carbon of ≤0.03%, a proportion by mass of chromium of 24.0% to 26.0%, a proportion by mass of molybdenum of 3.0% to 4.5%, a proportion by mass of nickel of 6.0% to 8.0%, and a proportion by mass of nitrogen of 0.24% to 0.35%.

Alternatively, the stainless steel may be an austenitic-ferritic, corrosion-resistant stainless steel having the short material designation X2CrNiMoCuWN25-7-4 (materials number: 1.4501). This stainless steel has a proportion by mass of carbon of ≤0.03%, a proportion by mass of chromium of 24.0% to 26.0%, a proportion by mass of molybdenum of 3.0% to 4.0%, a proportion by mass of nickel of 6.0% to 8.0%, a proportion by mass of copper of 0.50% to 1.00%, a proportion by mass of tungsten of 0.50% to 1.00%, and a proportion by mass of nitrogen of 0.20% to 0.30%.

Alternatively, the stainless steel may be an austenitic, corrosion-resistant stainless steel having the short material designation X2CrNiMo18-15-3 (materials number: 1.4441). This stainless steel has a proportion by mass of carbon of not more than 0.030%, a proportion by mass of chromium of 17.0% to 19.0%, a proportion by mass of molybdenum of 2.70% to 3.0%, a proportion by mass of nickel of 13.0% to 15.0%, a proportion by mass of manganese of not more than 2.00%, a proportion by mass of copper of not more than 0.50%, a proportion by mass of silicon of not more than 0.75%, a proportion by mass of phosphorus of not more than 0.025%, a proportion by mass of sulfur of not more than 0.003%, and the proportion by mass of nitrogen of not more than 0.10%.

Alternatively, the stainless steel may be an austenitic, corrosion-resistant stainless steel having the short material designation X5CrNi18-10 (materials number: 1.4301). This stainless steel has a proportion by mass of carbon of ≤0.07%, a proportion by mass of chromium of 17.5% to 19.5%, a proportion by mass of nickel of 8.0% to 10.5%, and a proportion by mass of nitrogen of ≤0.11%.

Alternatively, the stainless steel may be an austenitic, corrosion-resistant stainless steel having the short material designation X4CrNi18-12 (materials number: 1.4303). This stainless steel has a proportion by mass of carbon of ≤0.06%, a proportion by mass of chromium of 17.0% to 19.0%, a proportion by mass of nickel of 11.0% to 13.0%, and a proportion by mass of nitrogen of ≤0.11%.

Alternatively, the stainless steel may be an austenitic, corrosion-resistant stainless steel having the short material designation X8CrNiS18-9 (materials number: 1.4305). This stainless steel has a proportion by mass of carbon of ≤0.10%, a proportion by mass of chromium of 17.0% to 19.0%, a proportion by mass of nickel of 8.0% to 10.0%, a proportion by mass of sulfur of 0.15% to 0.35%, and a proportion by mass of copper of ≤1.00%.

Alternatively, the stainless steel may be an austenitic, corrosion-resistant stainless steel having the short material designation X2CrNi19-11 (materials number: 1.4306). This stainless steel has a proportion by mass of carbon of ≤0.030%, a proportion by mass of chromium of 18.0% to 20.0%, a proportion by mass of nickel of 10.0% to 12.0%, and a proportion by mass of nitrogen of ≤0.11%.

Alternatively, the stainless steel may be an austenitic, corrosion-resistant stainless steel having the short material designation X2CrNi18-9 (materials number: 1.4307). This stainless steel has a proportion by mass of carbon of ≤0.030%, a proportion by mass of chromium of 17.5% to 19.5%, a proportion by mass of nickel of 8.0% to 10.5%, and a proportion by mass of nitrogen of ≤0.11%.

Alternatively, the stainless steel may be an austenitic, corrosion-resistant stainless steel having the short material designation X2CrNi18-10 (materials number: 1.4311). This stainless steel has a proportion by mass of carbon of ≤0.030%, a proportion by mass of chromium of 17.5% to 19.5%, a proportion by mass of nickel of 8.5% to 11.5%, and a proportion by mass of nitrogen of 0.12% to 0.22%.

Alternatively, the stainless steel may be an austenitic, corrosion-resistant stainless steel having the short material designation X6CrNiTi18-10 (materials number: 1.4541). This stainless steel has a proportion by mass of carbon of ≤0.08%, a proportion by mass of chromium of 17.0% to 19.0%, a proportion by mass of nickel of 9.0% to 12.0%, and a proportion by mass of titanium of not more than 0.70%.

Alternatively, the stainless steel may be an austenitic, corrosion-resistant stainless steel having the short material designation X6CrNiNb18-10 (materials number: 1.4550). This stainless steel has a proportion by mass of carbon of ≤0.08%, a proportion by mass of chromium of 17.0% to 19.0%, a proportion by mass of nickel of 9.0% to 12.0%, and a proportion by mass of niobium of not more than 1.00%.

Alternatively, the stainless steel may be an austenitic, corrosion-resistant stainless steel having the short material designation X3CrNiCu18-9-4 (materials number: 1.4567). This stainless steel has a proportion by mass of carbon of ≤0.04%, a proportion by mass of chromium of 17.0% to 19.0%, a proportion by mass of nickel of 8.5% to 10.5%, and a proportion by mass of copper of 3.0% to 4.0%.

Alternatively, the stainless steel may be an austenitic, corrosion-resistant stainless steel having the short material designation X10CrNi18-8 (materials number: 1.4310). This stainless steel has a proportion by mass of carbon of 0.05% to 0.15%, a proportion by mass of chromium of 16.0% to 19.0%, a proportion by mass of molybdenum of ≤0.80%, and a proportion by mass of nickel of 6.0% to 9.5%.

Alternatively, the stainless steel may be an austenitic, corrosion-resistant stainless steel having the short material designation X5CrNiMo17-12-2 (materials number: 1.4401). This stainless steel has a proportion by mass of carbon of ≤0.07%, a proportion by mass of chromium of 16.5% to 18.5%, a proportion by mass of molybdenum of 2.00% to 2.50%, a proportion by mass of nickel of 10.0% to 13.0%, and a proportion by mass of nitrogen of ≤0.10%.

Alternatively, the stainless steel may be an austenitic, corrosion-resistant stainless steel having the short material designation X2CrNiMo17-12-2 (materials number: 1.4404). This stainless steel has a proportion by mass of carbon of ≤0.030%, a proportion by mass of chromium of 16.5% to 18.5%, a proportion by mass of molybdenum of 2.00% to 2.50%, a proportion by mass of nickel of 10.0% to 13.0%, and a proportion by mass of nitrogen of ≤0.10%.

Alternatively, the stainless steel may be an austenitic, corrosion-resistant stainless steel having the short material designation X6CrNiMoTi17-12-2 (materials number: 1.4571). This stainless steel has a proportion by mass of carbon of ≤0.08%, a proportion by mass of chromium of 16.5% to 18.5%, a proportion by mass of molybdenum of 2.00% to 2.50%, a proportion by mass of nickel of 10.5% to 13.5%, and a proportion by mass of titanium of not more than 0.70%.

Alternatively, the stainless steel may be an austenitic, corrosion-resistant stainless steel having the short material designation X2CrNiMoN17-13-3 (materials number: 1.4429). This stainless steel has a proportion by mass of carbon of ≤0.030%, a proportion by mass of chromium of 16.5% to 18.5%, a proportion by mass of molybdenum of 2.5% to 3.0%, a proportion by mass of nickel of 11.0% to 14.0%, and a proportion by mass of nitrogen of 0.12% to 0.22%.

Alternatively, the stainless steel may be an austenitic, corrosion-resistant stainless steel having the short material designation X2CrNiMo18-14-3 (materials number: 1.4435). This stainless steel has a proportion by mass of carbon of ≤0.030%, a proportion by mass of chromium of 17.0% to 19.0%, a proportion by mass of molybdenum of 2.5% to 3.0%, a proportion by mass of nickel of 12.5% to 15.0%, and a proportion by mass of nitrogen of ≤0.10%.

Alternatively, the stainless steel may be an austenitic, corrosion-resistant stainless steel having the short material designation X3CrNiMo17-13-3 (materials number: 1.4436). This stainless steel has a proportion by mass of carbon of ≤0.05%, a proportion by mass of chromium of 16.5% to 18.5%, a proportion by mass of molybdenum of 2.5% to 3.0%, a proportion by mass of nickel of 10.5% to 13.0%, and a proportion by mass of nitrogen of ≤0.10%.

Alternatively, the stainless steel may be an austenitic, corrosion-resistant stainless steel having the short material designation X2CrNiMoN17-13-5 (materials number: 1.4439). This stainless steel has a proportion by mass of carbon of ≤0.030%, a proportion by mass of chromium of 16.5% to 18.5%, a proportion by mass of molybdenum of 4.0% to 5.0%, a proportion by mass of nickel of 12.5% to 14.5%, and a proportion by mass of nitrogen of 0.12% to 0.22%.

Alternatively, the stainless steel may be an austenitic, corrosion-resistant stainless steel having the short material designation X1NiCrMoCu25-20-5 (materials number: 1.4539). This stainless steel has a proportion by mass of carbon of ≤0.020%, a proportion by mass of chromium of 19.0% to 21.0%, a proportion by mass of molybdenum of 4.0% to 5.0%, a proportion by mass of nickel of 24.0% to 26.0%, a proportion by mass of copper of 1.20% to 2.00%, and a proportion by mass of nitrogen of ≤0.15%.

Alternatively, the stainless steel may be an austenitic, corrosion-resistant stainless steel having the short material designation X2CrNiMnMoNbN25-18-5-4 (materials number: 1.4565). This stainless steel has a proportion by mass of carbon of ≤0.030%, a proportion by mass of chromium of 24.0% to 26.0%, a proportion by mass of molybdenum of 4.0% to 5.0%, a proportion by mass of nickel of 16.0% to 19.0%, a proportion by mass of manganese of 5.0% to 7.0%, a proportion by mass of nitrogen of 0.30% to 0.60%, and a proportion by mass of niobium of ≤0.15%.

Alternatively, the stainless steel may be an austenitic, corrosion-resistant stainless steel having the short material designation X1NiCrMoCuN25-20-7 (materials number: 1.4529). This stainless steel has a proportion by mass of carbon of ≤0.020%, a proportion by mass of chromium of 19.0% to 21.0%, a proportion by mass of molybdenum of 6.0% to 7.0%, a proportion by mass of nickel of 24.0% to 26.0%, a proportion by mass of copper of 0.50% to 1.50%, and a proportion by mass of nitrogen of 0.15% to 0.25%.

Alternatively, the stainless steel may be an austenitic, corrosion-resistant stainless steel having the short material designation X1CrNiMoCuN20-18-7 (materials number: 1.4547). This stainless steel has a proportion by mass of carbon of ≤0.020%, a proportion by mass of chromium of 19.5% to 20.5%, a proportion by mass of molybdenum of 6.0% to 7.0%, a proportion by mass of nickel of 17.5% to 18.5%, a proportion by mass of copper of 0.50% to 1.00%, and a proportion by mass of nitrogen of 0.18% to 0.25%.

Alternatively, the stainless steel may be an austenitic, corrosion-resistant stainless steel having the short material designation X1CrNiMoCuN24-22-8 (materials number: 1.4652). This stainless steel has a proportion by mass of carbon of ≤0.020%, a proportion by mass of chromium of 23.0% to 25.0%, a proportion by mass of molybdenum of 7.0% to 8.0%, a proportion by mass of nickel of 21.0% to 23.0%, a proportion by mass of manganese of 2.0% to 4.0%, and a proportion by mass of nitrogen of 0.45% to 0.55%.

In a further embodiment of the invention, the medical product is a medical, preferably surgical, instrument. The instrument may further be a reusable instrument or a single-use instrument.

In addition, the instrument may be a minimally invasive instrument, i.e. an instrument usable in minimally invasive surgery.

The surgical instrument may especially be selected from the group consisting of a spreading instrument, gripping instrument, clamping instrument, cutting instrument, sewing device, endoscope and combined instrument.

The spreading instrument may, for example, be a surgical hook, a retractor, a wound spreader, a sternal spreader, a wound closer, a speculum or a trocar sleeve.

The gripping instrument may, for example, be a set of tweezers, a clamp, a needle holder or a set of grasping forceps.

The clamping instrument may, for example, be a soft clamp, especially for temporary occlusion of the intestine and fine vessels, or a preparatory clamp.

The cutting instrument may, for example, be a scalpel, a knife, a set of shears, a set of branch forceps, a set of bone splinter forceps, a set of ring forceps, an electrotome, a conchotome, a cauter or an ultrasonic knife.

The sewing device may especially be a stapler or a staple remover.

The combined instrument may be an endostapler or a stapler which, for example, clamps and simultaneously precisely cuts a hollow organ. In addition, the combined instrument may be a combined needle holder which, as a universal sieving device, can both grip and cut.

Moreover, the surgical instrument may be a hammer.

Moreover, the surgical instrument may be a chisel, especially a flat chisel or gouge, such as a bone gouge, or a curette, especially a bone curette.

Moreover, the surgical instrument may be a probe.

Moreover, the surgical instrument may be a bone punch.

Moreover, the surgical instrument may be a lever or elevator or a raspatory.

In a second aspect, the invention relates to a medical product comprising or consisting of a metal or an alloy, wherein the medical product is produced or producible by a method according to the first aspect of the invention and/or has at least one of the following features:
- a pitting corrosion potential of 100 mV to 1200 mV, especially of 200 mV to 800 mV, preferably of 400 mV to 500 mV (measured against a standard hydrogen electrode), and/or
- a contact angle of 80° to 140°, especially of 90° to 130°, preferably of 100° to 120°, and/or
- a passive layer, especially of chromium oxide, having a thickness of 1 nm to 10 nm, especially 3 nm to 10 nm, preferably 5 nm to 10 nm, which coats at least sections of the surface of the medical product, especially only in sections or completely.

The aforementioned pitting corrosion potentials and contact angles are particularly advantageous with regard to the corrosion resistance of the medical product.

The expression "pitting corrosion potential" in the context of the present invention is understood to mean the electrochemical potential, which can be determined with an electrochemical cell using a three-electrode arrangement. Pitting corrosion potential is characterized by a rapid rise in current and describes the collapse of the passive layer with onset of pitting corrosion. An increase in pitting corrosion protection results in an improvement in corrosion resistance through a reduction in propensity to pitting corrosion. Pitting corrosion potential can be measured according to ASTM G5-13-1 or DIN EN ISO 10993-15.

The expression "contact angle" in the context of present invention shall be understood to mean the angle formed by a liquid droplet on the surface of the medical product with respect to the surface thereof. A reduced contact angle is associated with reduced contact of the liquid droplet on the surface of the medical product. A reduction in contact angle particularly advantageously results in an improvement in corrosion resistance and cleanability of the medical product.

The contact angle can be measured according to ASTM D 7334-08. Alternatively, the measurement of the contact angle can be conducted by means of a contact angle measuring instrument available from dataPhysics under the trademark CONTACT ANGLE SYSTEM OCA 15 PLUS™ and using a 0.9% sodium chloride solution (B. Braun), with a droplet volume of 1 µl. For measurement of the contact angle, the samples in this case may be washed in a regular manufacturing process and cleaned prior to the measurement in demineralized water in an ultrasound bath for 5 minutes, with rinsing of the samples with demineralized water and blowing dry with oil-free compressed air directly prior to the measurement.

The medical product is preferably a medical, preferably surgical, instrument.

With regard to further features and advantages of the medical product, for avoidance of repetition, reference is made completely to the details given in the context of the first aspect of the invention. The features and advantages described therein in relation to the method and the medical product are also applicable mutatis mutandis to the medical product according to the second aspect of the invention.

DETAILED DESCRIPTION

Further features and advantages of the invention will be apparent from the description of preferred embodiments with reference to examples that follow. It is possible here for features of the invention each to be implemented on their own or in combination with one another. The embodiments described hereinafter serve to further elucidate the invention without restricting it thereto.

EXAMPLES

1. Surface Treatment of a Surgical Instrument or Representative Specimens Thereof by a Method of the Invention The specimens used were produced from the same material (X20Cr13) and with the same manufacturing steps as the surgical instruments (e.g. clamps, needle holders, shears with hard metal and the like).

SEM/EDX analyses (extraneous material and doubled-over material) were conducted on the instruments.

Potentiodynamic tests (pitting corrosion potential) were likewise conducted on the instruments.

Contact angle measurements (contact angle) were conducted on sample platelets (planar surface without shadows).

Scratch resistance measurements (volume of the wear scar) were conducted by means of a pin-on-disk experiment on sample platelets.

Prior to the surface treatment, surgical instruments and sample platelets according to the current production chain of surgical instruments were shaped and heat-treated.

For subsequent surface treatment, a surgical instrument (Aesculap BH110R clamp) and sample platelets were first treated by means of slide finishing in acidic solution over a period of four hours and then brightened by slide finishing in aqueous solution over a period of one hour.

Thereafter, the surgical instrument and the sample platelets were treated by means of blasting. Blasting agents used were stainless steel wire grains having an average ball diameter of 300 µm. An injector blasting system was used for the blasting. The blasting was conducted under a pressure of 2 bar.

Subsequently, the surface of the surgical instrument and of the sample platelets was electrochemically processed in an electrolyte composed of phosphoric acid (38% by weight to 58% by weight) and sulfuric acid (26.6% by weight to 52.0% by weight) at 80° C. For this purpose, a current density of 18.5 A/dm² was first employed. The electropolishing was conducted over a period of 90 seconds. A voltage of 5 to 6 volts was established here. Thereafter, operation was continued at a current density of 1.9 A/dm². The electrochemical etching was conducted over a period of 90 seconds. A voltage of 1.8 to 2.1 volts was established here. Finally, a current density of 18.5 A/dm² was once again employed. The electropolishing was conducted over a period of 10 seconds. A voltage of 5 to 6 volts was established here.

Thereafter, the surface of the surgical instrument and of the specimens was passivated. For this purpose, the surgical instrument and the sample platelets were immersed into a 14.4% by weight nitric acid. The passivating was conducted at a temperature of 40° C. over a period of 10 minutes.

Finally, the instrument and the sample platelets were dried under an air atmosphere at 80° C. for 10 minutes.

On conclusion of the surface treatment of the surgical instrument and of the test specimens, no doubled-over material or overlapping material and no extraneous material transfer were detectable. The instruments had a pitting corrosion potential of 565 mV. The sample platelets had a contact angle of 106.8°. The volume of the wear scar was not measurable since wear was too low.

2. Surface Treatment of a Surgical Instrument By a Method of the Generic Type

A surgical instrument (Aesculap BH110R clamp) and sample platelets were first treated by means of slide finishing over a period of four hours. Thereafter, the surgical instrument and the sample platelets were brightened over a period of one hour.

Thereafter, the surgical instrument and the specimens were treated by means of blasting. For this purpose, glass beads having an average diameter of 40 μm to 70 μm were used. The blasting was conducted in an injector blasting system under a pressure of 4 bar.

Subsequently, the surgical instrument and the specimens were subjected to passivation. For this purpose, a 10% by weight citric acid solution was used. The passivating was effected at a temperature of 55° C. over a period of 10 minutes.

On conclusion of the surface treatment of the surgical instrument and of the sample platelets, many instances of doubled-over material or overlapping material were detectable. In addition, an extraneous material transfer of 1.2% was detected. The pitting corrosion potential of the corrosion specimens was 356 mV. In addition, the sample platelets had a contact angle of 66.0°. The volume removed in the wear scar was 55 244 μm³.

CONCLUSION

The above-described comparison of a method of the invention and of a method of the generic type shows that the method of the invention leads to more corrosion-resistant and especially more scratch-resistant products. On top of that, the method of the invention is capable of reducing the risk of occurrence of surface discoloration by comparison with methods of the generic type. Moreover, the method of the invention leads to products of better cleanability (see contact angles measured).

The invention claimed is:

1. A method of surface treatment and/or manufacture of a medical product, the medical product comprising a metal or an alloy, wherein the method comprises the sequence of steps in the following order:
    a) dulling a surface of the medical product;
    b) electropolishing the surface of the medical product;
    c) electrochemically etching the surface of the medical product; and
    d) electropolishing the surface of the medical product,
        wherein step b) and step d) are each conducted at a voltage of 2.0 V to 10.0 V and/or step b) and step d) are each conducted at a current density of 5 A/dm² to 50 A/dm²,
        and wherein step c) is conducted at a voltage of 1.2 V to <2.1 V and/or at a current density of 1.4 A/dm² to 2.4 A/dm².

2. The method according to claim 1, wherein step a) is preceded by a grinding operation on the surface of the medical product.

3. The method according to claim 1, wherein step a) is performed by treating the surface of the medical product with a blasting agent.

4. The method according to claim 1, wherein step b) is conducted over a period of 30 s to 130 s.

5. The method according to claim 1, wherein step b) and step d) are each conducted at a voltage of 5 V to 9 V and/or each at a current density of 8 A/dm² to 40 A/dm².

6. The method according to claim 1, wherein step c) is conducted over a period of 30 s to 130 s.

7. The method according to claim 1, wherein step c) is conducted at a voltage applied to an anode of 1.4 V to 1.7 V and/or at a current density of 1.6 A/dm² to 2.2 A/dm².

8. The method according to claim 1, wherein step d) is conducted over a shorter period than step b).

9. The method according to claim 1, wherein steps b), c) and d) are each conducted using an acidic aqueous electrolyte solution comprising a mineral acid.

10. The method according to claim 1, further comprising the step of:
    e) treating the surface of the medical product with a passivating acid or a passivating acid-containing solution after steps a), b), c) and d).

11. The method according to claim 10, wherein step e) comprises treating the surface of the medical product with the passivating acid, and wherein the passivating acid is citric acid and/or nitric acid.

12. The method according to claim 10, further comprising the steps of:
    f) sterilizing the medical product; and
    g) packing the medical product,
    wherein step f) is performed prior to step g), or step f) is performed after step g).

13. The method according to claim 1, wherein the medical product consists of a stainless steel.

14. The method according to claim 1, wherein step a) is preceded by a slide finishing and/or belt finishing on the surface of the medical product.

15. The method according to claim 1, wherein step a) is performed by treating the surface of the medical product with a ductile blasting agent and/or blasting agent that are/is free of corners and/or edges.

16. The method according to claim 1, wherein step a) is performed by treating the surface of the medical product with a blasting agent comprising a metal or an alloy.

17. The method according to claim 9, wherein the mineral acid is selected from the group consisting of phosphoric acid, sulfuric acid and a mixture thereof.

18. The method according to claim 1, wherein the medical product consists of a chromium-containing corrosion-resistant stainless steel.

19. The method according to claim 1, wherein the dulling step generates a microstructure that reduces the reflection of light on the surface of the medical product.

20. A method of surface treatment and/or manufacture of a medical product, the medical product comprising a metal or an alloy, wherein the method comprises the sequence of steps in the following order:
   a) dulling a surface of the medical product;
   b) electropolishing the surface of the medical product;
   c) electrochemically etching the surface of the medical product; and
   d) electropolishing the surface of the medical product,
   wherein step b) and step d) are each conducted at a voltage of 2.0 V to 10.0 V and step c) is conducted at a voltage of 1.2 V to 1.8 V,
   or wherein step b) and step d) are each conducted at a current density of 5 $A/dm^2$ to 50 $A/dm^2$ and step c) is conducted at a current density of 1.4 $A/dm^2$ to 2.4 $A/dm^2$.

* * * * *